United States Patent
Bender et al.

(10) Patent No.: US 10,715,006 B2
(45) Date of Patent: Jul. 14, 2020

(54) HIGH POWER FLYWHEEL SYSTEM WITH ROTOR HAVING A FLOWABLE BACK IRON AND A COMPOSITE STRUCTURE SUPPORT

(71) Applicant: Helix Power Corporation, Boxford, MA (US)

(72) Inventors: Donald Bender, San Ramon, CA (US); Matthew Lazarewicz, Boxford, MA (US)

(*) Notice: Subject to any disclaimer, the term of this patent is extended or adjusted under 35 U.S.C. 154(b) by 330 days.

(21) Appl. No.: 15/506,366

(22) PCT Filed: Aug. 20, 2015

(86) PCT No.: PCT/US2015/046042
§ 371 (c)(1),
(2) Date: Feb. 24, 2017

(87) PCT Pub. No.: WO2016/032839
PCT Pub. Date: Mar. 3, 2016

(65) Prior Publication Data
US 2017/0279335 A1 Sep. 28, 2017

Related U.S. Application Data

(60) Provisional application No. 62/042,021, filed on Aug. 26, 2014.

(51) Int. Cl.
*H02K 7/00* (2006.01)
*H02K 7/02* (2006.01)
(Continued)

(52) U.S. Cl.
CPC .............. *H02K 7/025* (2013.01); *H02K 1/30* (2013.01); *H01F 3/08* (2013.01); *H02K 1/02* (2013.01);
(Continued)

(58) Field of Classification Search
CPC . Y02E 60/16; H02K 7/00; H02K 7/02; H02K 7/025; H02K 1/28; H02K 1/30;
(Continued)

(56) References Cited

U.S. PATENT DOCUMENTS 3,683,216 A * 8/1972 Post .................. H02K 7/025
310/67 R
5,717,263 A * 2/1998 Cox .................. F16F 15/305
252/62.54
(Continued)

FOREIGN PATENT DOCUMENTS

DE 102011014834 A1 7/2012

OTHER PUBLICATIONS

Nippon Steel Technical Report, Jul. 2001, Pitch-Based Carbon Fiber with Low Modulus and High Heat Conduction Copy.*
(Continued)

*Primary Examiner* — Maged M Almawri
(74) *Attorney, Agent, or Firm* — Verrill; John W. Powell (57) ABSTRACT

A flywheel energy storage system includes a rotating assembly having a plurality of magnets and a longitudinal axis about which the rotating assembly rotates and static assembly having a stator configured to magnetically interact with the plurality of magnets of the rotating assembly. The rotating assembly includes a rotor back iron supporting the plurality of magnets and disposed further from the longitudinal axis in a radial direction than the plurality of magnets. The back iron being formed of a material having a first stiffness, relative permeability of at least 10, and an electrical conductivity 10% or less than the electrical conductivity of magnetic steel. There is composite structure supporting the rotor back iron and disposed further from the longitudinal axis in a radial direction than the rotor back iron. The
(Continued)

composite structure comprises a composite material having a second stiffness, which is greater than the first stiffness.

18 Claims, 8 Drawing Sheets

(51) Int. Cl.
*H02K 1/30* (2006.01)
*H01F 3/08* (2006.01)
*H02K 1/27* (2006.01)
*H02K 1/02* (2006.01)

(52) U.S. Cl.
CPC ............ *H02K 1/27* (2013.01); *H02K 1/2786* (2013.01); *H02K 7/02* (2013.01); *H02K 2213/03* (2013.01); *Y02E 60/16* (2013.01)

(58) Field of Classification Search
CPC ..................................................... H02K 1/02; H02K 1/27; H02K 1/278; H02K 1/2786; H02K 7/28; H02K 7/30; H02K 2213/03; H01F 3/08; H01F 3/02; H01F 3/00; H01F 3/10; H01F 2003/103; H01F 2003/106
USPC ...... 310/74, 152, 153, 44; 74/572.1, 572.11, 74/572.12, 572.2, 572.21
See application file for complete search history.

(56) References Cited

U.S. PATENT DOCUMENTS

| | | | |
|---|---|---|---|
| 5,874,797 A | 2/1999 | Pinkerton | |
| 8,816,543 B2* | 8/2014 | Kozar | F16F 15/3156 310/44 |
| 2001/0054856 A1* | 12/2001 | Gabrys | F16F 15/305 310/261.1 |
| 2012/0062154 A1* | 3/2012 | Chiao | H02K 3/47 318/161 |
| 2013/0264894 A1* | 10/2013 | Kim | H02K 1/02 310/44 |
| 2013/0313922 A1* | 11/2013 | Kim | H02K 1/12 310/44 |

OTHER PUBLICATIONS

IEEE article High-Speed Kinetic Energy Buffer Optimization of Composite Shell and Magnetic Bearings, vol. 61, No. 6.*
Electrical Resistivity and Conductivity—Wikipedia.*

* cited by examiner

HIGH POWER FLYWHEEL SYSTEM WITH ROTOR HAVING A FLOWABLE BACK IRON AND A COMPOSITE STRUCTURE SUPPORT

CROSS-REFERENCE TO RELATED APPLICATIONS

This application is the US National Stage of International Application No. PCT/US2015/046042 filed on Aug. 20, 2015, which claims the priority of the Aug. 26, 2014 U.S. Provisional Application No. 62/042,021. The contents of each of the above-referenced applications are incorporated herein by reference in their entirety.

FIELD OF INVENTION

This invention relates to high power flywheel systems and more particularly to such a flywheel system with the ability to cycle continuously at more than approximately 200 kW.

BACKGROUND

Short duration power variations on a MW scale occur in many different systems. For example, electrified rail experiences voltage surges and sags when trains decelerate and accelerate. Areas of the grid experience surges, sags and ramps when variable renewable energy sources, particularly wind and solar, provide a significant fraction of the generated power. Draglines used at mines, material handling equipment, and islanded systems all experience frequent, short duration MW scale power fluctuations. Heretofore, the high power and high number of cycles of these disturbances has made it prohibitive for conventional energy storage solutions to be applied. Instead, the excessive fluctuations are dealt with by ramping generating assets with the consequence of reduced efficiency, higher energy cost, higher O&M cost, and reduced service life.

A more effective and less costly solution to this problem is an energy storage device that can source or sink 1 MW for approximately 90 seconds, switch between charge and discharge in a few milliseconds, cycle continuously, and deliver 1,000,000 or more full charge-discharge cycles without degradation. In order to be of value in a range of applications, the storage system should be relatively compact and transportable so it may be deployed in many applications.

No battery or capacitor can economically provide this capability without periodic replacement or significant oversizing. Pumped hydro storage cannot respond as rapidly and is neither compact nor transportable. Heretofore no flywheel energy storage system has attained all of these capabilities including power and stored energy.

Batteries are used in short duration power management applications such as hybrid vehicles. However, even the most durable batteries have a throughput capacity of 3000 which corresponds to 3000 cycles with a depth of discharge of 100% of the capacity of the battery. Consequently batteries are useful in applications with limited cycle life such as vehicles but cannot withstand long-term operation with frequent cycling. Ultra-capacitors have much greater cycle life than batteries but degrade after several hundred thousand cycles and are costly when sized to store more than a few seconds worth of energy.

Flywheels are well suited to withstanding large numbers of cycles without degradation or failure. Cycle life is limited by the fatigue strength of the material that at 1 million cycles is about 50% of new strength for steel and 85% of new strength for carbon composite. However, operation with continuous high power cycling has proven challenging. Even small inefficiencies resulting in losses on the rotor can cause excessive rotor heating. Heretofore no flywheel system with the ability to cycle continuously at more than approximately 200 kW has been developed.

SUMMARY OF INVENTION

In one aspect, the invention features a flywheel energy storage system configured to rotationally accelerate to convert electrical energy into kinetic energy during a charging mode and to rotationally decelerate to convert kinetic energy into electrical energy during a discharging mode. The flywheel comprises a rotating assembly having a plurality of magnets and a longitudinal axis about which the rotating assembly rotates. There is a static assembly having a stator configured to magnetically interact with the plurality of magnets of the rotating assembly. The rotating assembly further includes a rotor back iron supporting the plurality of magnets and disposed further from the longitudinal axis in a radial direction than the plurality of magnets. The rotor back iron is formed of a material having a first stiffness, relative permeability of at least 10, and an electrical conductivity 10% or less than the electrical conductivity of magnetic steel. There is a composite structure supporting the rotor back iron and disposed further from the longitudinal axis in a radial direction than the rotor back iron; wherein the composite structure comprises a composite material having a second stiffness, which is greater than the first stiffness of the rotor back iron.

In other aspects of the invention, one or more of the following features may be included. The rotor back iron may comprise a composite formed of a plurality of particles of magnetic material suspended in a non-conducting matrix material. The non-conducting matrix material may be formed of one of elastomer, epoxy, or plastic. The plurality of particles may comprise iron particles and/or steel particles. The plurality of particles may fill more than 70% of the volume defined by the rotor back iron. The plurality of particles may include particles of a first size and a second size, wherein the first particle size may be more than five times larger than the second particle size. The particles of the second particle size may fill interstitial spaces between the particles of the first particle size. The rotor back iron may be formed of a material having a relative permeability of at least 20. The first stiffness may be less than $5*10^6$ psi and the second stiffness may be greater than $5*10^6$ psi. The rotor back iron may be formed of a material capable of withstanding at least 20,000 G-force units. The rotor back iron may be formed of a material which becomes actively flowable when exposed to forces higher than 500 g-force units. The flywheel may further include a retainer positioned proximate each axial end of the rotor back iron to contain axial flow of the back iron. One of the axial retainers may be a hub which connects a shaft of the flywheel energy storage system to the rotating assembly. The composite structure may include an inner composite region and an outer composite region. The inner composite region may include include a plurality of layers of filament wound carbon and glass fiber having a first density and a first modulus and the outer composite region having a second density and a second modulus, wherein the second density and the second modulus are lower than the first density and a first modulus, respectively. The flywheel may further include a housing enclosing the rotating assembly and the static assembly.

In another aspect of this invention, there is a flywheel energy storage system configured to rotationally accelerate to convert electrical energy into kinetic energy during a charging mode and to rotationally decelerate to convert kinetic energy into electrical energy during a discharging mode. There is a rotating assembly having a plurality of magnets and a longitudinal axis about which the rotating assembly rotates. There is a static assembly having a stator configured to magnetically interact with the plurality of magnets of the rotating assembly. The rotating assembly further includes a rotor back iron supporting the plurality of magnets and disposed further from the longitudinal axis in a radial direction than the plurality of magnets. The rotor back iron is formed of a composite material formed of a plurality of particles of magnetic material suspended in a non-conducting matrix material. The composite structure supports the rotor back iron and is disposed further from the longitudinal axis in a radial direction than the rotor back iron.

In other aspects of the invention one or more of the following features may be be included. The non-conducting matrix material may be formed of one of elastomer, epoxy, or plastic. The plurality of particles may comprise iron particles and/or steel particles. The plurality of particles may fill more than 70% of the volume defined by the rotor back iron.

An object of the invention is to provide a flywheel system using a rotor with very high cycle life and a built in motor-generator that operates at very high efficiency with negligible on-rotor losses.

A further object of the invention is to provide able to provide flywheel system capable of MW charge and discharge through many cycles, respond rapidly, and be compact and deployable in many applications.

DETAILED DESCRIPTION

A flywheel system stores and retrieves electrical energy. The system may communicate with AC or DC systems. In the case of an AC application, the flywheel system comprises an inverter that transfers energy between the application and a DC bus and a motor drive that transfers energy between the DC bus and the motor within the flywheel module itself. For DC applications, a motor drive transfers energy between the DC application and the motor within the flywheel module. The flywheel module comprises the flywheel rotating assembly, the stator, bearings, the housing and various other elements, such as sensors. In addition to the inverter, motor drive, and flywheel module, ancillary systems such as the vacuum pump and cooling system make up the balance of the system. During charging, energy is drawn from the application and used to accelerate the rotor thereby converting electrical energy into kinetic energy. During discharging, the motor is operated as a generator decelerating the rotor and converting kinetic energy into electrical energy.

A flywheel comprises a cylinder made from composite materials where the rotating portion of the integral motor/generator is affixed to the interior of a composite rim. The rotating portion of the integral motor/generator may have an axial extent that is the full length of the composite cylinder, part of the length of the composite cylinder or may be broken up into a number of axial zones with a total axial extent not greater than the length of the composite cylinder. The rotor assembly comprises the composite rim and the rotating elements of the motor/generator which are affixed to one or more hubs that in turn are affixed to a central shaft. The shaft includes a suitable mechanical or magnetic bearing that have long life. A stator installed within the rotor comprises stator windings and preferably a stator back iron. Slot-less, slotted or ironless configurations may be used. The rotating assembly is surrounded by a vacuum enclosure so the rotor may spin at high speed with little aerodynamic drag. Energy is stored in the flywheel or extracted using a motor drive to energize the stator windings.

The rotor spins in a vacuum lower than 1 torr in order to minimize aerodynamic drag. Therefore, heat deposited on the rotor is a critical concern as the only available practical cooling mechanism is radiation to the housing. At the temperatures suitable for operation of a composite cylinder, radiation is an ineffective heat transfer mechanism. Therefore, it is critical to avoid heating the rotor. In one embodiment herein, eddy current losses in the rotating assembly are reduced to very low levels or eliminated from the rotor by using a rotor back iron material and magnet material with low electrical conductivity.

Figure 1:
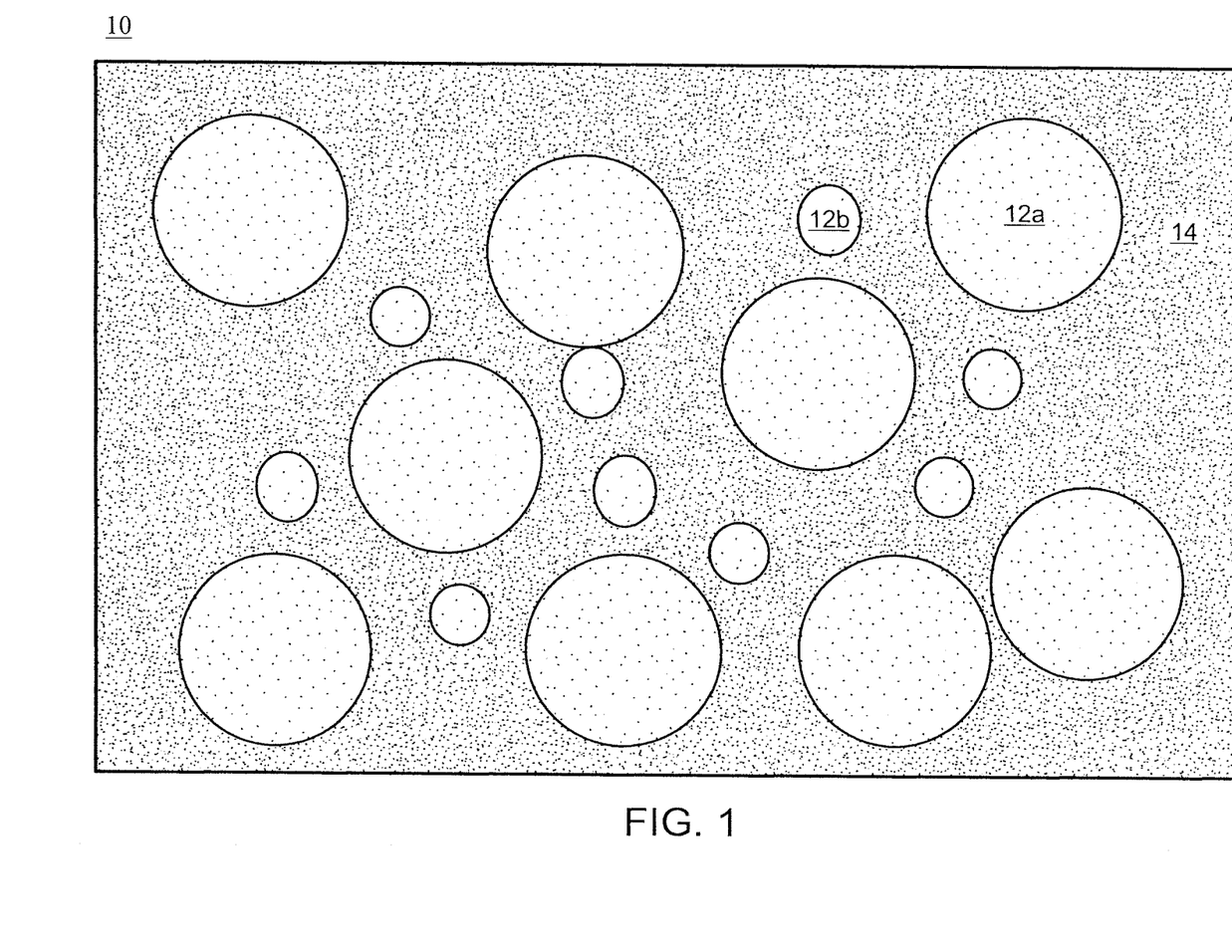
FIG. 1 shows a cross-sectional view of a back rotor back iron according to this invention.

The rotor back iron material is preferably formed as a composite 10, FIG. 1, with a relative permeability of at least 10 and preferably more than 20 which is attained by using magnetic iron or steel particles 12a, b of varying sizes suspended in an electrically non-conductive matrix 14. In one embodiment two sizes of particle are used where one size 12a is more than 5 times larger than the other size 12b. This allows the smaller particles to fill the interstitial spaces between the larger particles attaining a volumetric fraction of magnetic material exceeding 70%. The particles 12a, b are held together by a non-conducting matrix material 14 such as elastomer, epoxy, or plastic. The composite back iron material has an electrical conductivity of 10% or less than that of magnetic steel.

The forces acting on the rotor back iron and magnetic material lining the bore of the rotor arise from the body force of centrifugal acceleration experienced by the magnetic material and sheer forces cause by deformation of the rotor. At high speed, the rotor will dilate and become shorter due to Poisson contraction. As the back iron and magnetic materials are less stiff than the rotor material and as centrifugal forces are causing the back iron and magnetic materials to be in intimate contact with the composite, the back iron and magnetic materials will dilate and contract axially with the composite. Moreover, the rotor back iron has a stiffness which is less than the composite structure which supports the back iron. The stiffness of the back iron may be less than $5*10^6$ psi and the stiffness of the composite structure may be greater than $5*10^6$ psi. Actual values will be dependent upon the specific application.

At full operating speed, the environment experienced by the back iron is unique and is not found in machines other than high-speed flywheels with cylindrical rotors constructed from composite material. This environment comprises circumferential strain of at least 0.7% and as much as 2%, axial contraction of at least 0.2%, centrifugal acceleration of at least 20,000 G's (G force units) and as much as 1,000,000 G's, and a radial compression due to the overlaying permanent magnet of at least 1,000 psi and as much as 50,000 psi.

The composite rotor dilates and expands in the circumferential direction. While metals typically fail at a strain well below 1%, composites can strain as much as 2% or more before failing. High-speed composite flywheels may experience strain in the circumferential direction of 1% in normal operation.

Hard permanent magnets, such as NdFeB segmenst, or conventional magnetic steel bearing directly on the bore of the composite will be subject to the same centrifugal force as the composite rotor where the magnets or back iron lining the composite rotor are in contact with it. The conventional magnetic steel or hard magnets are much weaker than the composite and are unable to maintain structural integrity through their own strength. Consequently, the conventional magnetic steel or hard magnets bear on the composite with considerable contact pressure. The high normal force between the composite rotor and the conventional magnetic steel or hard magnet causes these elements to strain-follow the composite as it dilates. Because magnetic steel cannot strain to 1% without yield, the magnetic steel deforms plastically and is susceptible to low cycle fatigue. Because permanent magnet material is brittle, strain-following the dilation of a composite rotor causes it to fracture.

Cracks in the rotor back iron material may have a deleterious impact on motor performance as the permeability of the material decreases reducing flux in the airgap. The same is not true for the magnet material as the magnet material has a relative permeability of 1. Therefore, avoiding cracks in the rotor back iron is desirable.

In the present invention, the rotor back iron material is produced to have properties of being flowable when subjected to the high centrifugal force arising from the high spin speed. By flowable, what is meant is material that has shape following characteristics of liquids, for example, they can take the shape of a constraining component, like water in a glass. They can also plastically deform by creep or plastic strain withour cracking such as grease or other highly viscous material. By using a flowable material, high centrifugal force creates high hydrostatic pressure in the rotor back iron material which causes the back iron material to flow thereby preventing the formation of cracks due to strain following. This behavior is also referred to as self-healing. The rotor magnet material is supported by the back iron material and exerts addition load on rotor back iron material. This causes the rotor back iron material to experience hydrostatic pressure through its entire thickness as it has no free surface. In one embodiment the rotor back iron material is constrained from flowing axial by flange-like retainers or dams. In another embodiment the rotor back iron material is constrained from flowing axially by the hub. In a further embodiment rotor back iron flow is restrained by features of the geometry of the rotor produced during constriction of the rotor.

Hydrostatic pressure exerted by the rotor back iron material against the rotor has a desirable impact on the state of stress in the composite. For a composite rim produced by filament winding the strength of the rotor in the radial direction is low and only low levels of radial tensile stresses are tolerable. The hydrostatic pressure applied on the bore by the matrix material has the advantageous effect of adding a tensile stress to the inner layers that causes them to expand, more nearly matching the strain of the outer layers of composite, introducing a radial compressive stress component that reduces or eliminates radial tensile stress. The ability of the rotor back iron material to flow also makes the rotor partially self-balancing. Magnet material lines the bore of the rotor back iron material.

In the present invention, the rotor back iron material may be produced as a single cylindrical part in a mold, as a single part using the composite cylinder as a mold, or as a set of discreet pieces that are assembled into the bore of the rotor.

The method of production used for the rotor back iron material depends on the matrix material that is used. For curable matrix materials such as elastomers, the particles of various sizes are combined with uncured elastomer. Proportions are selected so the finished part will have volumetric density of iron or other ferromagnetic material exceeding 70% and a relative permeability of at least 10. The materials are placed in a mold and cured. In one embodiment the materials are cured under external pressure. In another embodiment the materials are cured under vacuum. In a further embodiment, the magnet material is produced using techniques similar the rotor back iron except that instead of iron or other ferromagnetic material, particles of permanent magnet material of various sizes are used. As alternatives to elastomers, epoxies and thermoplastics may be used.

Two types of composites which may be used are those that contained magnetic particles of a single size (carbonyl iron or steel shot) and those that combined magnetic particles of greatly disparate sizes, which can be called bidisperse composites.

In general, the process for making the composite involves mixing the particles with the binder, placing the mixture into a mold, applying pressure to the mixture mechanically, and curing the mixture in a vacuum. Some specific examples are described as follows. The particles used for these composites may be 4-7 µm carbonyl iron or 300 µm cut wire steel shot, for example. The composites may be prepared by mixing the particles into a resin. At higher loadings (>50 vol. %) the resulting composites have a Bingham plastic rheology, something like stiff clay, A variety of resins may be used, such as Epon™ 828 obtained from Polysciences, Inc. with a T403 Jeffamine® curing agent obtained from Huntsman Corporation or a highly flexible commercial resin, G/Flex 650, obtained from West System Inc.

Bidisperse magnetic particle composites may be fabricated to increase the iron loading in the composites beyond that which could be attained using either the carbonyl iron particles or the steel shot alone. One approach may be to first blend 4-7 micron carbonyl iron particles into a polymer to create a dense colloidal suspension that still has a manageable rheology. An Epon-based paste may be formed by adding 7.7 g Fe to 1.0 g of premixed resin, yielding an iron loading of 50 vol. % and a density of 4.45 g/ml. To this paste ~300 micron cut-wire steel particles may be added. Then 19.6 g of steel shot may be added to obtain 56 vol. % steel shot in the carbonyl iron paste. The total iron content would be about 78 vol. %. This approach enables the formulation of much higher loadings of Fe than can be and achieved with either component alone, as great as 80% vol. or more.

In one embodiment, the magnet material is arranged in arc segments of substantially uniform angular extent and alternating polarity with a cross section that is constant in axial extent. Alternatively, the segments may be skewed such as to mitigate cogging. Patterns of polarization can include alternating north and south poles and poles of a single polarity interspersed with sections lacking polarization as would be used in a homopolar configuration. In another embodiment the magnet material may be arranged in a series of cylindrical bands with substantially uniform radial polarization where the polarization varies from band to band axially. This latter configuration would be used as the rotating portion of a motor or as the rotating portion of a magnetic bearing.

The rotor constructed using the configuration and materials disclosed here, in particular the rotor back iron, can be designed to operate cycling continuously at over 200 kW with very low losses on the rotor.

The magnetic circuit of the motor comprises the rotating elements and the stator. The rotating elements include the magnets and back iron. The stator comprises turns of wire. Litz wire is preferable as eddy current losses in the stator are reduced. The wires are adjacent to a stator back iron that completes the magnetic circuit. The stator backiorn may be slotted in which case the wires will be installed in the slots or it may be slot-less. The stator back iron material may be solid, made from laminations, or may be a ferrite. Alternatively the stator back iron may be made of material similar to that usable in the rotor back iron.

In order to achieve continuous high power operation the stator must be cooled. The windings may be located in vacuum with cooling applied to the stator back iron. Alternatively, the stator windings may be surrounded by a non-electrically conducting shell or a very thin metal shell. Within this shell the heat is removed from the windings by having them immersed in a coolant.

The rotating assembly of the flywheel is mounted on bearings that may be mechanical, such as ball bearings, or magnetic. Magnetic bearings may be fully active having actuators that control all 5 degrees of freedom other than rotation about the spin axis. Passive elements such as permanent magnets may be used to reduce the forces on the mechanical or active magnetic bearings. Mechanical bearings may be used in conjunction with magnetic bearings as touchdown or backup bearings that would only be used in the event of de-levitation. Mechanical and magnetic bearings have rotating and static elements. The static elements of the bearings are affixed to a foundation or stationary mechanical assembly. The motor stator is also affixed to this foundation or mechanical assembly. This assembly is installed in a vacuum enclosure where the foundation may be affixed to the enclosure or may be integral to it. In one embodiment the static elements are mounted to a base plate which forms part of the housing where the remaining portion of the housing attaches to the base plate like a bell jar having few or no feed-throughs. The intent of this configuration is to concentrate penetrations of the vacuum housing such as motor leads, sensor wires, and coolant plumbing to a single part in order to reduce cost.

Figure 2:
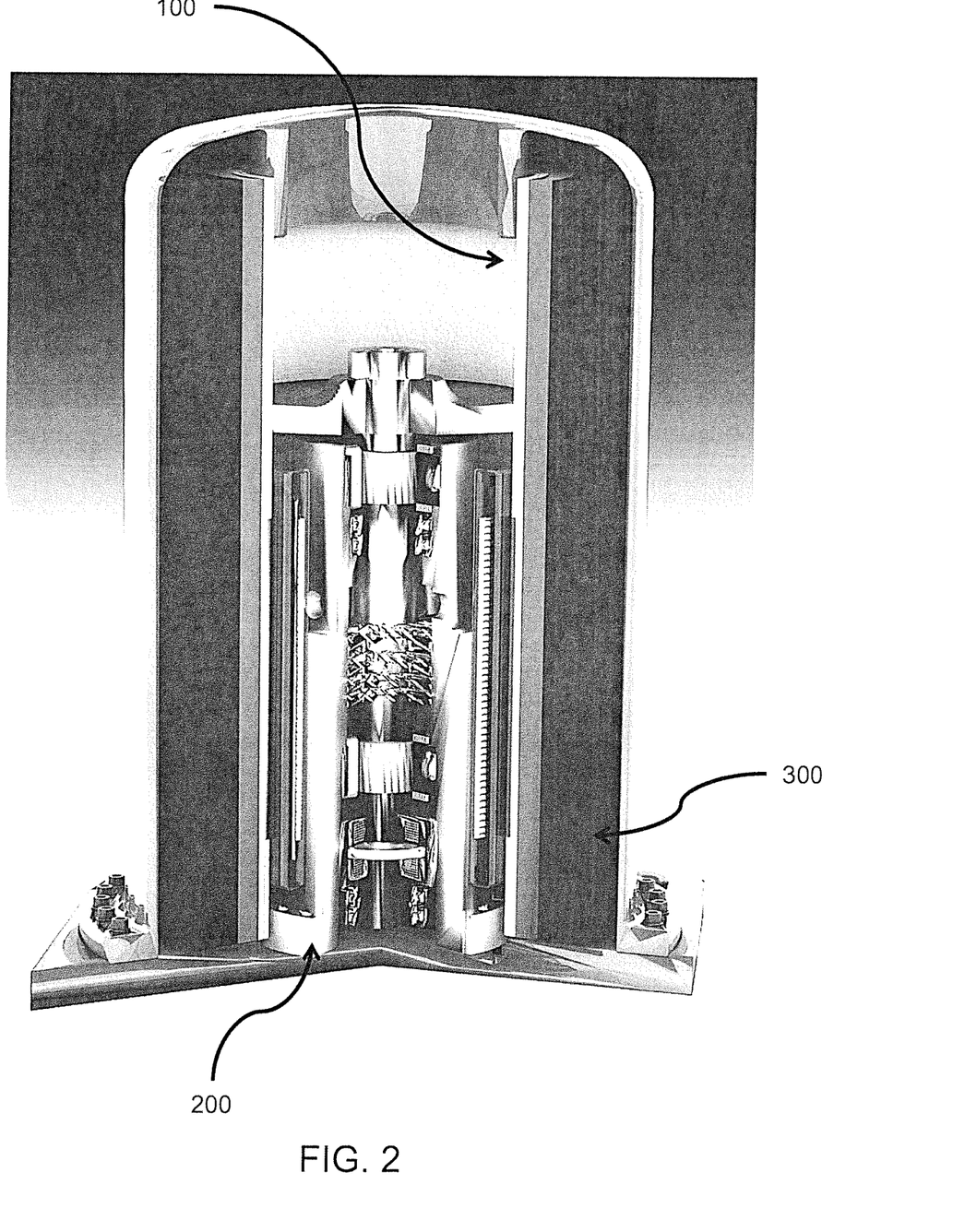
FIG. 2 shows a cutaway view of representative implementation of a flywheel according to this invention.

A specific embodiment of the invention is described below with regard to FIGS. 2-8. FIG. 2 shows the rotating assembly 100, the static internal assembly 200 and the housing assembly 300. Throughout this patent parts in the 100 series are part of the rotating assembly and all other parts are part of or mounted to the non-rotating assemblies.

Figure 3:
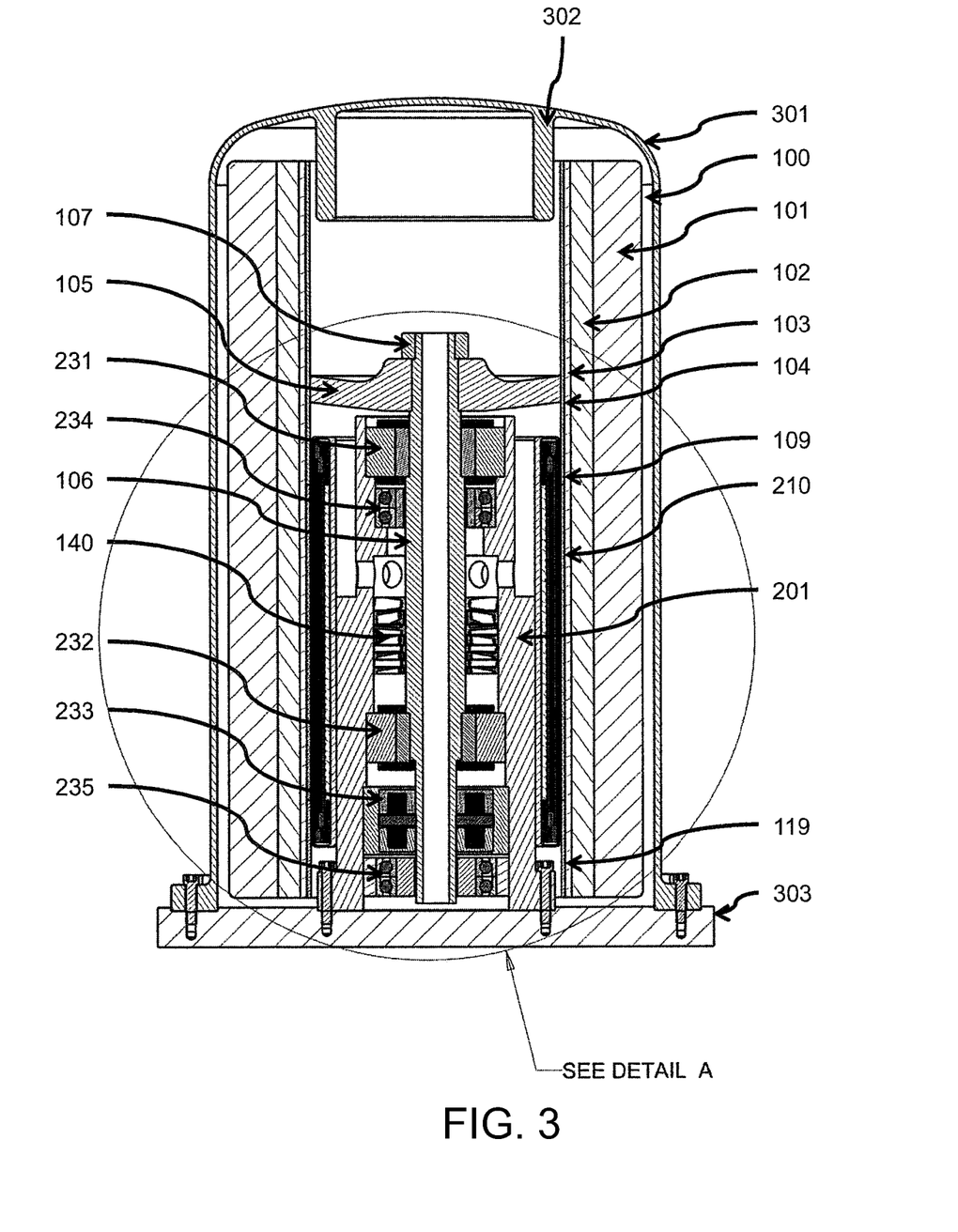
FIG. 3 shows a cross-sectional view of the flywheel of FIG. 1.
Figure 5:
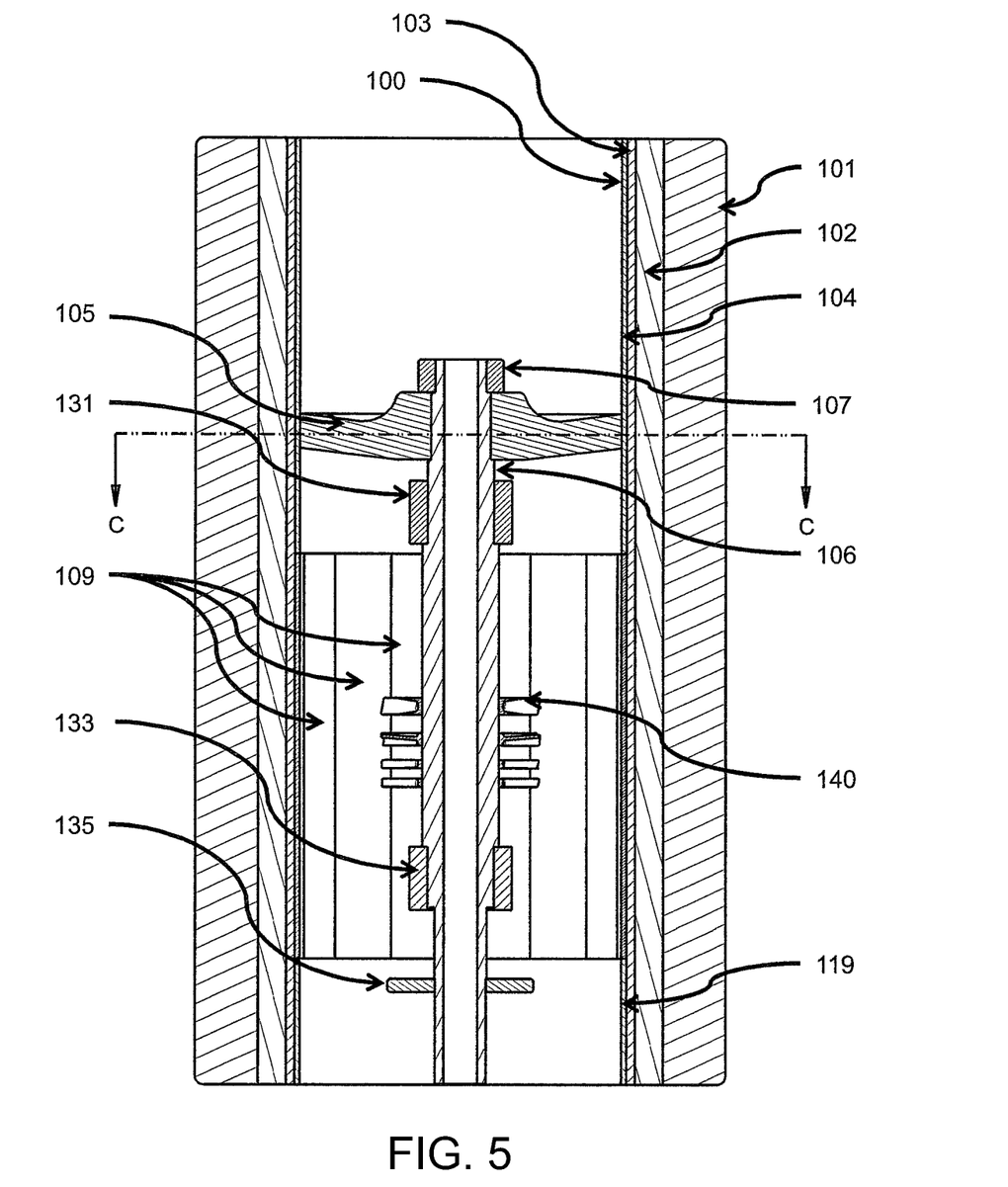
FIG. 5 shows the rotating assembly comprising a cylinder, hub, shaft and other elements.

FIG. 3 shows a cross section of the preferred embodiment of the invention where a monolithic cylinder comprises and outer composite region 101, an inner composite region 102, a rotor back iron 103, mass load 104, retainer 119, and magnets 109. This monolithic cylinder is mounted to the shaft 106 by a hub 105 that is secured thereto with a fastener 107. Referring to FIG. 5, also affixed to the shaft 106 are the upper radial magnetic bearing rotor 131, the lower radial magnetic bearing rotor 133, the axial magnetic bearing rotor, 133 and an internal vacuum pump 140. Referring again to FIG. 3, the rotating assembly runs on an upper radial magnetic bearing 234, a lower radial magnetic bearing 233 and an axial magnetic bearing 233. Also shown are upper touchdown bearing 234 and lower touchdown bearing 235 on which the shaft 106 runs in the event of failure of an active magnetic bearing. An integral vacuum pump 140 reduces pressure in the volume in which the monolithic composite cylinder spins. The vacuum housing 301 surrounds the rotating and static subassemblies and is mounted to a baseplate 303. Crash structure 302 is a feature affixed to the vacuum housing 301 against which the rotor will contact in the event of hub or shaft failure thereby preventing contact of the outer surface of the rotor with the housing 300.

Many variations are possible within the inventive concept. A single-hub 105 configuration is shown. Alternatively two or more hubs 105 may be used where the hubs 105 are separated axially in order to improve alignment between the monolithic cylinder and the shaft 106 and to improve the alignment of the shaft 106 with the principal moment of inertia of the rotating assembly.

The configuration shown locates components on the shaft 106 so that all bearing components are on one side of the hub 105. Alternatively the shaft 106 may extend through the hub 105 so that bearing components may be placed on either side of the hub 105 or hubs 105.

FIGS. 2 through 5 show a configuration where the major structural elements of the monolithic cylinder are an inner composite region 102 and an outer composite region 101. Typically these portions of the rotor would be constructed from filament wound carbon and glass fiber comprising many individual layers where more dense, lower modulus fiber would be used in the inner composite region 102 and the lower density, higher modulus fiber would be used in the outer region 101. Alternatively, the major structural elements may comprise a single composite region meaning that a single type of fiber is used. A further variation would involve the use of numerous layers where the layers vary in selection of fiber material, fiber fraction, angle at which the fiber is wound and tension at which the fiber is wound in order to minimize critical stresses and provide strength to the rotor in directions in addition to the circumferential direction.

Referring to FIG. 5, the magnets 109 have an axial extent approximately equal to the axial extent of the stator 210. Mass loads 104 and a retainer 119 are affixed beyond the axial extent of the magnets in order to provide mass load along the bore of the rotor that is generally uniform. Also evident in FIG. 5 are the segments of which the magnets are made. The magnets are polarized radially with the direction of polarization alternating between adjacent segments. FIG. 5 indicates 20 segments comprising a 10 pole-pair machine although any even number of poles may be used.

FIG. 5 indicates that the mass load 104 and the retainer 119 have the same thickness as the magnets. Alternatively the mass load may have a different thickness or may be eliminated entirely resulting in mass loading that is non-uniform along the length of the bore of the inner composite region. The retainer 119 is shown as being affixed to the back iron 103. Alternatively the retainer may be affixed to the bore of the inner composite region 102 where it may axially engage or retain either the back iron 103 or the back iron 103 and magnets 109.

Figure 6:
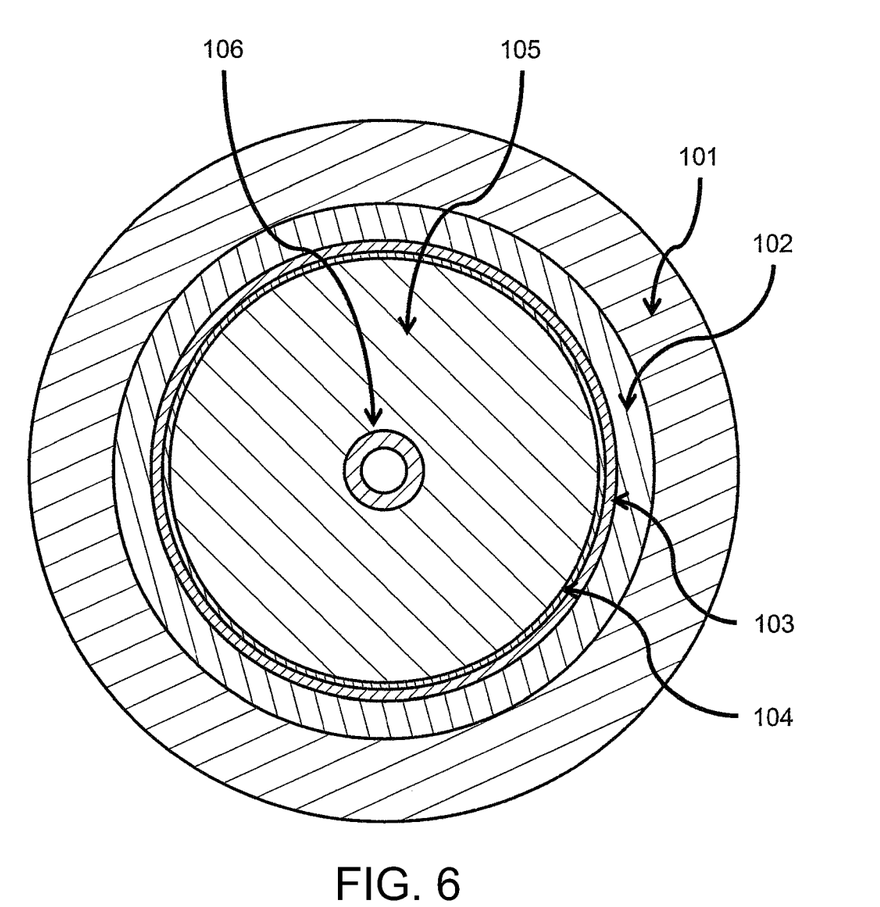
FIG. 6 shows a cross-section of the rotor in a plane passing through the hub that is perpendicular to the axis of rotation.

FIG. 6 shows the cross-section of the rotor assembly 100 taken through the hub 105. The shaft 106 is shown as being hollow although alternately the shaft may be solid. The figures show that the hub is affixed to the innermost layer of the monolithic cylinder which is the mass load 104. Alternatively, the magnets 109, mass load 104, and back iron 119 may be discontinuous axially and the hub 106 may be affixed to the inner composite region 102. Alternatively, the inner composite region 102 may also be discontinuous and the hub 105 may be affixed to the outer composite region 101. When affixed to either the inner composite layer 102 or the outer composite layer 101, the hub 105 may perform the function of a retainer arresting axial flow of the back iron 103, mass load 104, or magnets 109.

If used, the retainer 119 will have structural integrity and strength in its attachment to the inner composite layer 102 to support the hydrostatic pressure exerted by a flowable back iron 103 and magnets 109. Having potential to flow is what makes the back iron self healing. Azimuthally, the back iron 103, mass load 104, and magnets 109 are less rigid than the composite regions 101 and 102. Consequently the back iron 103, mass loads 104 and magnets 109 strain follow the inner composite region 102 exerting a hydrostatic pressure on the composite. Being constrained by the inner composite region 102, the magnets 109, back iron 103, and mass load 104 cannot flow azimuthally. The back iron 103, magnets 109, and mass load 104 are prevented from flowing in the axial direction either through shear communicating axial load to the inner composite region 102 or by the retainer 119 or a combination of multiple retainers 119 and the hub 105.

The hydrostatic pressure exerted by the magnets 109, mass load 104, retainer 119 and back iron 103 on the inner composite region 102 and the outer composite region 101 has the benefit of imposing a radial compressive stress on the composites regions. This is important because when spinning, the outermost portions of the rotor experience higher centrifugal force than the inner portions of the rotor which leads to radial tensile stress which in turn can lead to delamination. The hydrostatic pressure along the bore helps to suppress this.

Many variations are possible for the construction of the rotating assembly. The inner composite region 102 and the outer composite region 101 may be wound on a mandrel in which case the remaining elements of the system would be produced separately and then assembled into a wound rotor. Alternately, some or all of the interior elements of the rotor including the shaft 106, hub 105, back iron 103, magnets, 109, retainer 119, and mass load 104 may be mounted on a fixture so that the wound composite portions of the rotor may be wound directly on to them.

Figure 4:
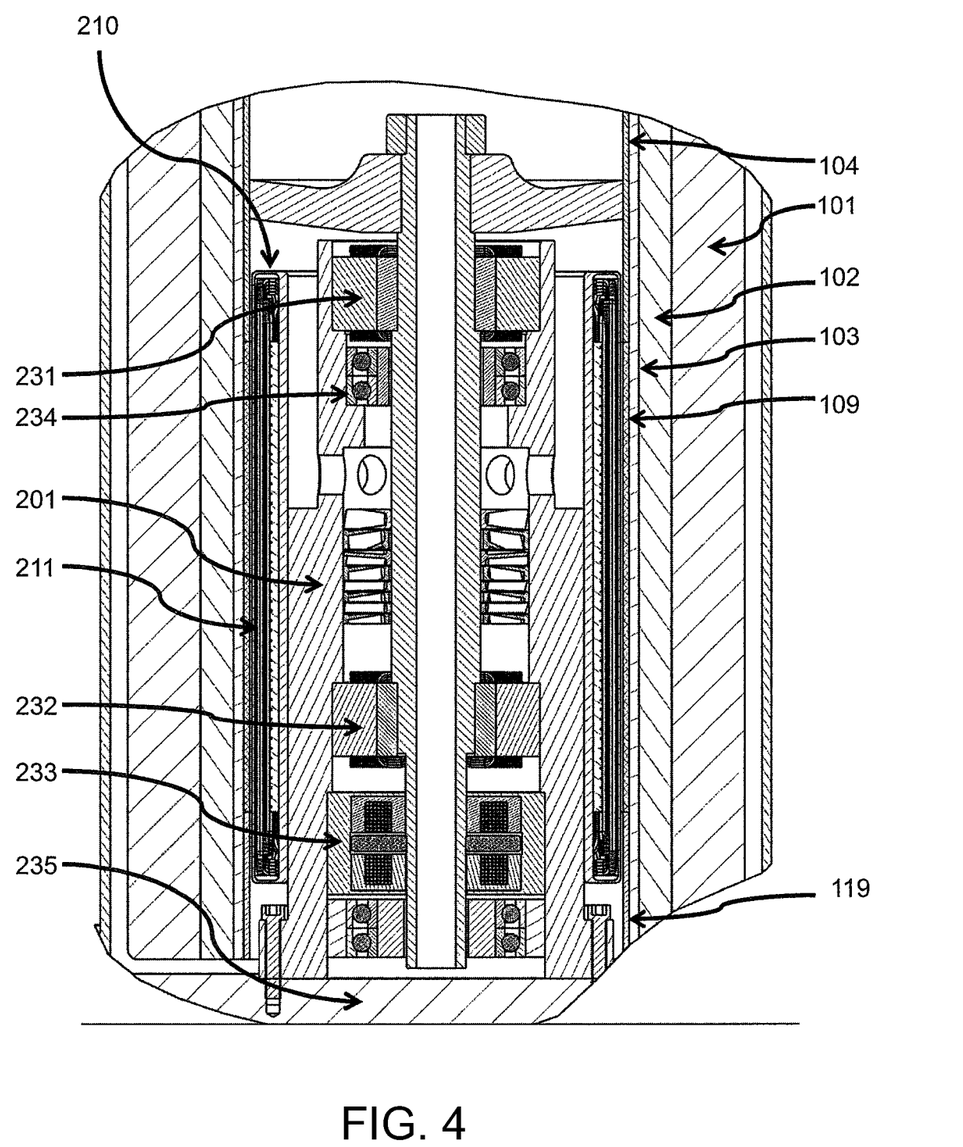
FIG. 4 shows an expanded view of the cross-sectional view of FIG. 3 for greater clarity.

FIG. 4 shows a cutaway view of the central portion of the flywheel illustrating the components in greater detail. The stator mounting structure 201 is the component or subassembly to which the static elements of the bearings are affixed including the upper radial magnetic bearing 231, the lower radial magnetic bearing 232, the axial magnetic bearing 233, the upper touchdown bearing 234, and the lower touchdown bearing 233. Also attached to the stator mounting structure is the stator 210 comprised in part of stator windings.

Figure 7:
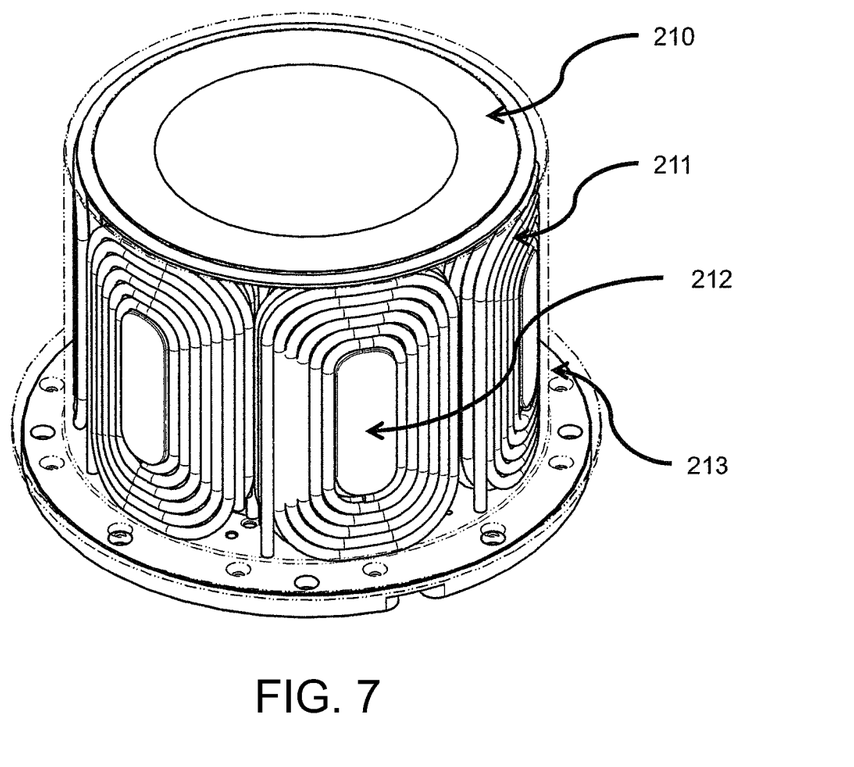
FIGS. 7 and 8 show stator winding configurations.

FIG. 7 presents an isometric view of a stator 210 with the stator shell 213 rendered as transparent. In this embodiment the stator windings 211 comprise coils of litz wire wound in a rectangular pattern in several layers where the coils do not overlap.

Figure 8:
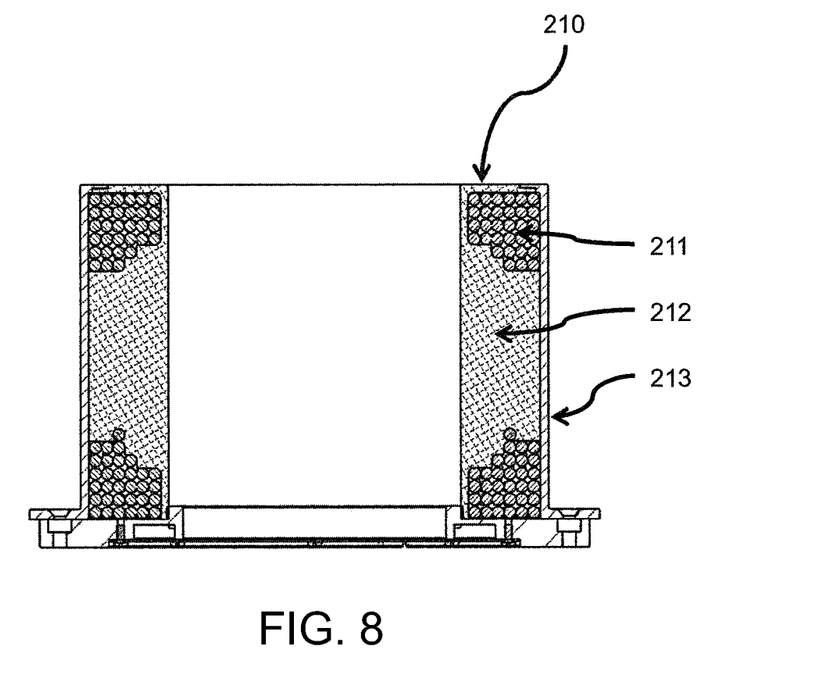

Referring to FIG. 8, a stator shell 213 is affixed to the stator form 212 creating a volume that encloses the windings 211. Within this enclosed volume the windings may be immersed in liquid that cool the windings 211 directly. As the static assembly 200 is surrounded by vacuum on all sides except where it is attached to the base 303, a cooling system would circulate the immersion cooling liquid in order to remove waste heat from the stator.

The magnets 109 and back iron 103 working together with the stator windings 211 and the portions of the stator structure 201 and stator form 212 made from magnetic material comprise a motor that is built into the flywheel. The motor may be said to be inside out as the rotating elements surround the stator 210.

Many variations are possible within the scope of the inventive concept. In additions to being located side by side, the windings may be skewed azimuthally so they overlap. Referring to FIG. 8, six layers of windings are shown but any number may be used.

The stator form 212 may comprise a non-magnetic material. If the stator support structure 201 is also non-magnetic, then the motor is said to be an air-core machine. If the stator structure 201 immediately adjacent to the stator form 213 is a magnetic material or the stator form 212 is made of magnetic material except where surrounding by the coils, then the motor is said to be a slotless machine. If the stator form 212 is made from magnetic material in the region where it is encircled by the coils, then the motor is a slotted machine.

While preferred embodiments of the present invention have been shown and described herein, various modifications may be made thereto without departing from the inventive idea of the present invention. Accordingly, it is to be understood the present invention has been described by way of illustration and not limitation. Other embodiments are within the scope of the following claims.

What is claimed is:

1. A flywheel energy storage system configured to rotationally accelerate to convert electrical energy into kinetic energy during a charging mode and to rotationally decelerate to convert kinetic energy into electrical energy during a discharging mode, the flywheel energy storage system comprising:

A rotating assembly having a plurality of magnets and a longitudinal axis about which the rotating assembly rotates; and A static assembly having a stator configured to magnetically interact with the plurality of magnets of the rotating assembly;

wherein the rotating assembly further includes:

A rotor back iron supporting the plurality of magnets and disposed further from the longitudinal axis in a radial direction than the plurality of magnets, wherein the rotor back iron is formed of a material having a first stiffness, relative permeability of at least 10, and an electrical conductivity 10% or less than the electrical conductivity of magnetic steel, and wherein the rotor back iron material is flowable when exposed to forces higher than 500 g-force units, wherein flowable means that the rotor back iron material can plastically deform without cracking; and A composite structure, including an interior region which supports the rotor back iron and is disposed further from the longitudinal axis in the radial direction than the rotor back iron; wherein the composite structure comprises a composite material having a second stiffness, which is greater than the first stiffness of the rotor back iron; and An axial retainer positioned to abut each axial end of the plurality of magnets in the interior region of the composite structure.

2. The flywheel energy storage system of claim 1 wherein the rotor back iron is formed of a material having a relative permeability of at least 20.

3. The flywheel energy storage system of claim 1 wherein one of the axial retainers is a hub which connects a shaft of the flywheel energy storage system to the rotating assembly.

4. The flywheel energy storage system of claim 1 further including a housing enclosing the rotating assembly and the static assembly.

5. The flywheel energy storage system of claim 1 wherein the first stiffness is less than $5*10^6$ psi and the second stiffness is greater than $5*10^6$ psi.

6. The flywheel energy storage system of claim 5 wherein the rotor back iron is formed of a material capable of withstanding at least 20,000 G-force units.

7. The flywheel energy storage system of claim 1 wherein the composite structure includes an inner composite region and an outer composite region.

8. The flywheel energy storage system of claim 7 wherein the inner composite region includes a plurality of layers of filament wound carbon and glass fiber having a first density and a first modulus and the outer composite region having a second density and a second modulus, wherein the second density and the second modulus are lower than the first density and a first modulus, respectively.

9. The flywheel energy storage system of claim 1 wherein the rotor back iron comprises a composite formed of a plurality of particles of magnetic material suspended in a non-conducting matrix material.

10. The flywheel energy storage system of claim 9 wherein the non-conducting matrix material is formed of one of elastomer, epoxy, or plastic.

11. The flywheel energy storage system of claim 9 wherein the plurality of particles comprise iron particles and/or steel particles.

12. The flywheel energy storage system of claim 9 wherein the plurality of particles fill more than 70% of a volume defined by the rotor back iron.

13. The flywheel energy storage system of claim 12 wherein the plurality of particles include particles of a first size and a second size, wherein the first particle size is more than five times larger than the second particle size.

14. The flywheel energy storage system of claim 13 wherein the particles of the second particle size fill interstitial spaces between the particles of the first particle size.

15. A flywheel energy storage system configured to rotationally accelerate to convert electrical energy into kinetic energy during a charging mode and to rotationally decelerate to convert kinetic energy into electrical energy during a discharging mode, the flywheel energy storage system comprising:

A rotating assembly having a plurality of magnets and a longitudinal axis about which the rotating assembly rotates; and A static assembly having a stator configured to magnetically interact with the plurality of magnets of the rotating assembly;

wherein the rotating assembly further includes:

A rotor back iron supporting the plurality of magnets and disposed further from the longitudinal axis in a radial direction than the plurality of magnets, the rotor back iron being formed of a composite material formed of a plurality of particles of magnetic material suspended in a non-conducting matrix material, wherein the rotor back iron material is flowable when exposed to forces higher than 500 g-force units, wherein flowable means that the rotor back iron material can plastically deform without cracking;

A composite structure supporting the rotor back iron and disposed further from the longitudinal axis in a radial direction than the rotor back iron; and An axial retainer positioned to abut each axial end of the plurality of magnets in the interior region of the composite structure.

16. The flywheel energy storage system of claim 15 wherein the non-conducting matrix material is formed of one of elastomer, epoxy, or plastic.

17. The flywheel energy storage system of claim 16 wherein the plurality of particles comprise iron particles and/or steel particles.

18. The flywheel energy storage system of claim 16 wherein the plurality of particles fill more than 70% of a volume defined by the rotor back iron.

\* \* \* \* \*